United States Patent
Suzuki

(10) Patent No.: US 12,208,920 B2
(45) Date of Patent: Jan. 28, 2025

(54) LANDING FACILITY, LANDING METHOD

(71) Applicant: AERONEXT INC., Tokyo (JP)

(72) Inventor: Yoichi Suzuki, Tokyo (JP)

(73) Assignee: AERONEXT INC., Tokyo (JP)

( * ) Notice: Subject to any disclaimer, the term of this patent is extended or adjusted under 35 U.S.C. 154(b) by 0 days.

(21) Appl. No.: 18/253,372

(22) PCT Filed: Dec. 16, 2020

(86) PCT No.: PCT/JP2020/047003
§ 371 (c)(1),
(2) Date: May 17, 2023

(87) PCT Pub. No.: WO2022/130542
PCT Pub. Date: Jun. 23, 2022

(65) Prior Publication Data
US 2024/0025576 A1  Jan. 25, 2024

(51) Int. Cl.
*B64F 1/00* (2024.01)
*B64U 10/10* (2023.01)

(52) U.S. Cl.
CPC ............ *B64F 1/00* (2013.01); *B64U 10/10* (2023.01)

(58) Field of Classification Search
CPC ...................... B64F 1/00; B64F 1/36
See application file for complete search history.

(56) References Cited

U.S. PATENT DOCUMENTS

| | | | |
|---|---|---|---|
| 2014/0252168 A1* | 9/2014 | Brody | E04H 6/44 244/114 R |
| 2016/0364989 A1 | 12/2016 | Speasl | |
| 2017/0175413 A1* | 6/2017 | Curlander | B64U 80/25 |
| 2018/0244404 A1* | 8/2018 | Park | E01F 3/00 |

FOREIGN PATENT DOCUMENTS

| | | | | |
|---|---|---|---|---|
| CN | 112278314 A | * | 1/2021 | ............ B60B 33/00 |
| JP | H04321492 A | | 11/1992 | |
| JP | 2016086732 A | | 5/2016 | |
| JP | 2019-23020 A | | 2/2019 | |
| JP | 6713696 B1 | | 6/2020 | |
| JP | 6761146 B1 | | 9/2020 | |
| WO | 2018155700 A1 | | 8/2018 | |

OTHER PUBLICATIONS

International Search Report dated Mar. 9, 2021 for International Application No. PCT/JP2020/047003.
Notice of Reasons for Refusal dated Aug. 29, 2024 for Japanese Patent Application No. 2022-569401.

* cited by examiner

*Primary Examiner* — Richard G Davis

(57) ABSTRACT

A landing facility that enables flight vehicles to land safely even in strong winds. The landing system of the invention includes a first area for landing a flight vehicle, a windbreak part having a predetermined height and cover part at least a portion of the perimeter of the first area, and a second area located away from the windbreak part, where the flight vehicle descends to a predetermined flight altitude. The flight altitude is lower than the predetermined height of the windbreak part. The second area is an area selected from a plurality of permitted areas where vertical descent is permitted. A portion of the windbreak part comprises a net.

12 Claims, 14 Drawing Sheets

LANDING FACILITY, LANDING METHOD

TECHNICAL FIELD

This invention relates to landing facilities and landing methods.

BACKGROUND ART

In recent years, research and demonstration tests have been conducted toward the practical application of delivery services using drones, unmanned aerial vehicles (UAVs), and other flight vehicles (hereinafter collectively referred to as flight vehicles). For practical application, it is desirable to improve not only reliability, safety, and efficiency during flight, but also the same during landing. In view of this situation, Patent Literature 1 discloses a system that realizes flight planning while ensuring safety at the port. (See, for example, Patent Literature 1).

Patent Literature 1 provides a flight management system that allows flight vehicles to land safely at a port (see, e.g., Patent Literature 1).

PRIOR ART LIST

Patent Literature

[Patent Literature 1] WO2018/155700

SUMMARY OF THE INVENTION

Technical Problem

Most flight vehicles currently in service development are so-called multicopters, which are equipped with multiple rotor blades, and it is known that these aircraft are easily affected by wind during flight and takeoff/landing, and in particular, vertical descent (landing operation) performed in strong crosswinds or updrafts can be dangerous. In Patent Literature 1, a wind sensor is installed at the port and wind information is used to determine whether takeoff and landing at the port is possible, thereby providing a safe landing.

However, due to the nature of the courier service, it is expected that the aircraft must land at a designated location even in strong winds, and in order to improve operational efficiency, it is necessary to avoid suspending flights and takeoffs and landings until the winds die down. Especially in locations where multiple flight vehicles come to deliver packages one after another, multiple flight vehicles will stay in the air waiting to land, which not only reduces efficiency but also worsens fuel consumption due to the increased fuel used.

With the port in Patent Literature 1, it is difficult for flight vehicles to land at the port while strong winds are observed, which reduces operational efficiency. Ports used for takeoff and landing should not only allow flight vehicles to land safely when there is no wind, but should also be equipped for stable takeoff and landing even under strong winds and other environmental conditions in order to improve operational efficiency.

Therefore, one purpose of this invention is to provide a landing facility and a landing method that enable flight vehicles to land safely even in strong winds.

Technical Solution

The invention provides a landing facility that includes a first area for landing a flight vehicle, a windbreak part that has a predetermined height and covers at least a portion of the perimeter of the first area, and a second area that is located away from the windbreak part and from which the flight vehicle descends to a predetermined flight altitude.

Advantageous Effects

According to the invention, a landing facility and a landing method can be provided to enable flight vehicles to land safely even in strong winds.

BRIEF DESCRIPTION OF THE DRAWINGS

FIG. 3 shows a schematic diagram of the airflow when the wind hits a windbreak part, which does not allow air to pass through.

DETAILED DESCRIPTION OF THE EMBODIMENTS

Figure 1:
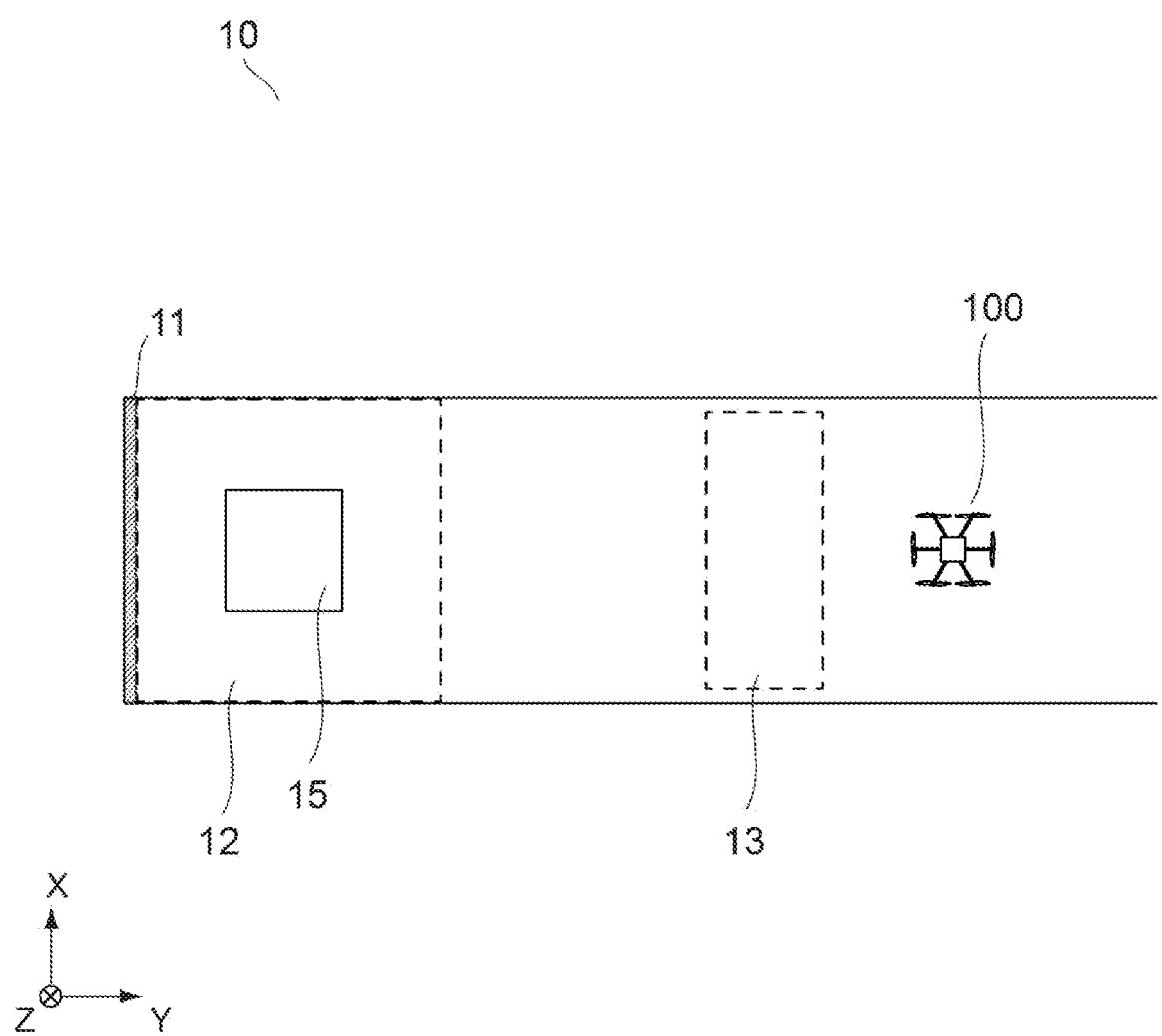
FIG. 1 shows a conceptual view of a landing facility according to the invention, viewed from the top.

The following is a list and description of the contents of this embodiment of the invention. The landing facility and landing method according to this embodiment of the invention consists of the following

[Item 1]

A landing facility, comprising:

a first area for landing a flight vehicle;

a windbreak part that has a predetermined height and covers at least a portion of the surroundings of the first area; and a second area located apart from the windbreak part and allowing the flight vehicle to descend to a predetermined flight altitude.

[Item 2]

The landing facility according to Item 1, wherein the flight altitude is lower than the predetermined height of the windbreak part.

[Item 3]
The landing facility as in item 1 or item 2,
wherein the second area is an area selected from a plurality of permitted areas where vertical descent is permitted.
[Item 4]
The landing facility as in any one of Items 1 to 3,
wherein a part of the windbreak part comprises a net.
[Item 5]
The landing facility as in any one of stems 1 to 3,
wherein the windbreak part is a building.
[Item 6]
The landing facility as in any one of items 1 to 5,
wherein the second area includes a descent instruction unit that instructs the flight vehicle to descend to a predetermined flight altitude.
[Item 7]
The landing facility as in any one of items 1 to 6,
wherein the first area includes a landing instruction unit that instructs the flight vehicle to land.
[Item 8]
A method of landing using a landing facility, comprising:
a first area for landing a flight vehicle;
a windbreak part that has a predetermined height and covers at least a portion of the perimeter of the first area; and
a second area located apart from the windbreak part and allowing the flight vehicle to descend to a predetermined flight altitude,
wherein the aircraft descends to the predetermined flight altitude in the second area and then lands in the first area.
[Item 9]
The landing method according to item 8,
wherein the flight altitude is an altitude lower than the predetermined height of the windbreak part.

DETAILS OF EMBODIMENTS ACCORDING TO THIS INVENTION

The following is a description of the landing facility and landing method according to this embodiment of the invention, with reference to the drawings.

Details of the First Embodiment

Figure 2:
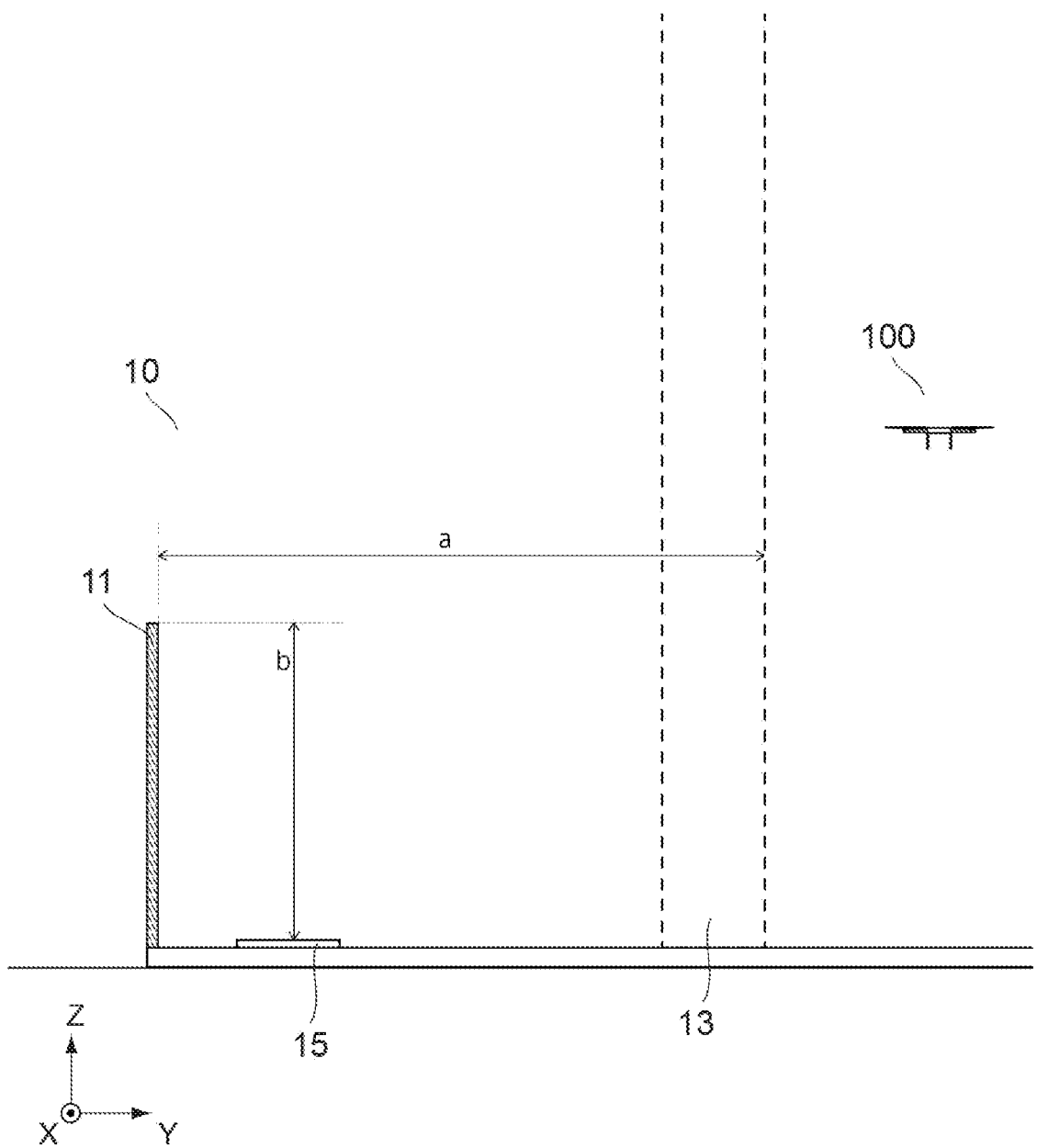
FIG. 2 shows a schematic view of the landing facility shown in FIG. 1 from the side.

As shown in FIG. 1 and FIG. 2, a landing facility 10 in this embodiment has a first area 12 comprising an area, shape, and material that can stably ground a flight vehicle 100 using the landing facility 10, and a windbreak part 11 that prevents wind from hitting the flight vehicle that is taking off or landing.

To prevent soil, sand, dust, and other debris from being kicked up by the propeller wash and potentially impacting the flight vehicle and cargo at a flight vehicle landing part 15 within the first area 12, it is desirable to have concrete, asphalt, or other paved surfaces in areas where the wind generated by the flight vehicle will be directed. Alternatively, plates or sheets made of metal, resin, or other materials can be used. Additionally, elevating the landing area from the ground can also help prevent debris from being stirred up. The trigger for the flight vehicle to start landing should be provided by GNSS or other location information, or by a marker, beacon, or other landing indication unit provided in the first area 12.

The windbreak part 11 must be of a configuration that is effective in dampening wind blowing from outside the first area toward inside the first area. Examples include panels, nets, fences, buildings, air curtains, green curtains, water curtains, etc.

Figure 4:
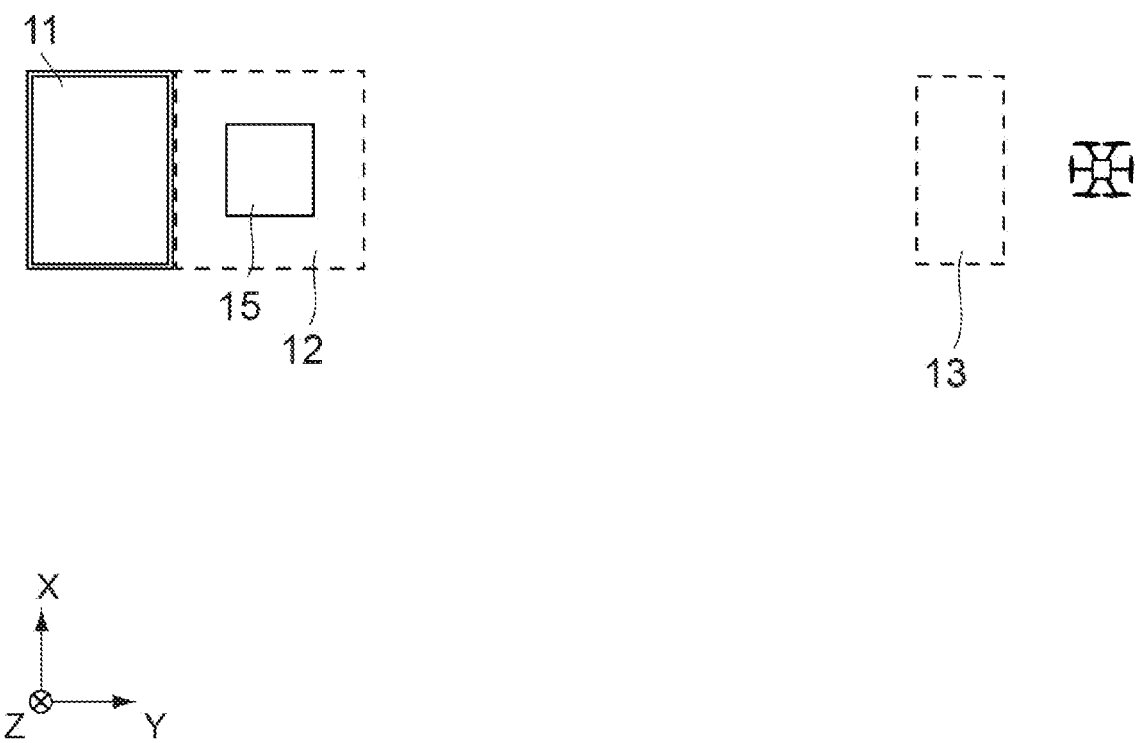
FIG. 4 shows a schematic diagram of the landing method according to the invention, viewed from the top.
Figure 5:
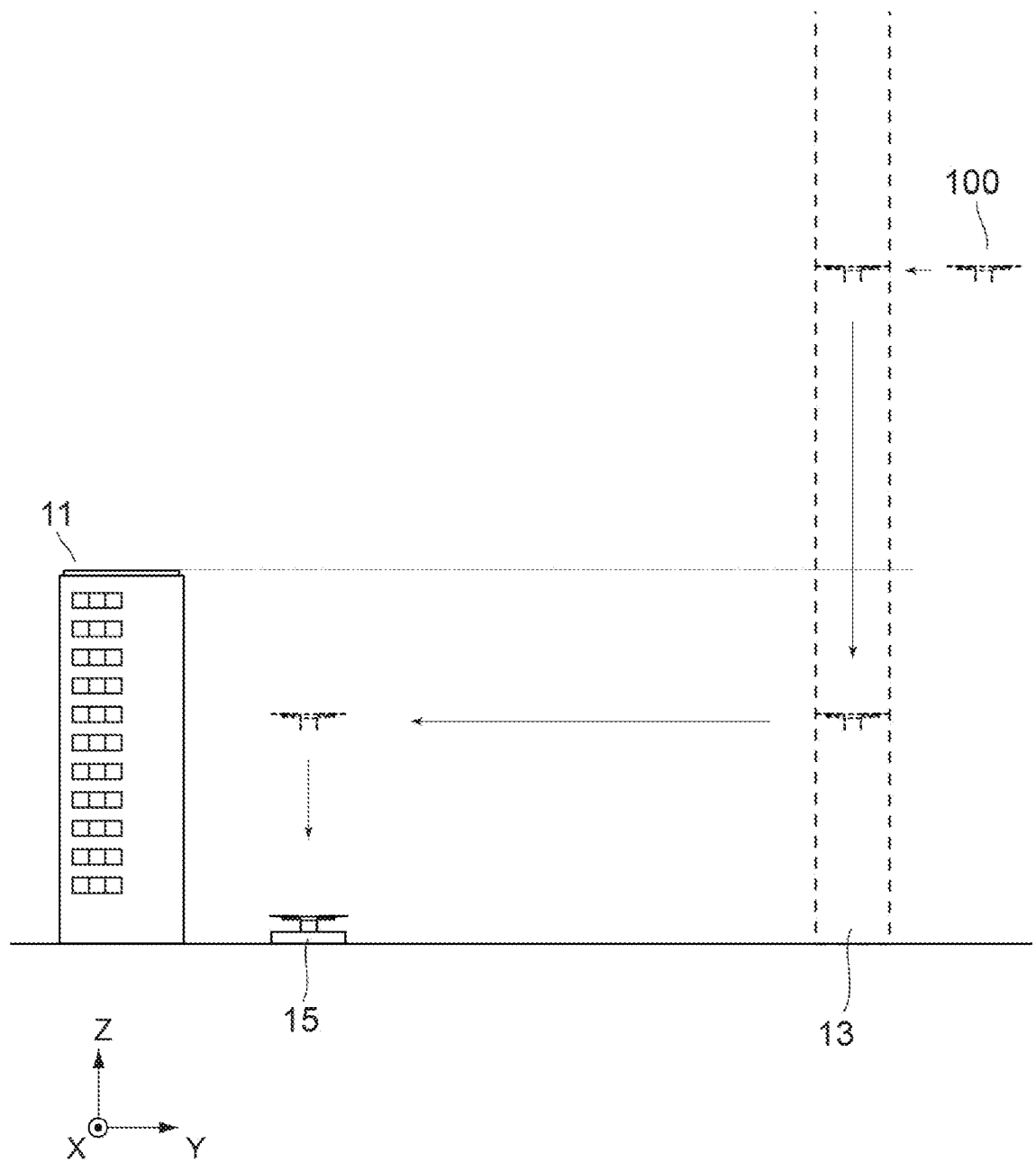
FIG. 5 shows a side view of the landing method of FIG. 4.

A simple and low-cost method of constructing the windbreak part 11 is to provide a frame or other structure to stretch the netting, or to fix a portion of the netting to an existing structure. For long-term operation, it is desirable to use outdoor construction materials that can withstand rain, wind, and ultraviolet rays, and to make the structure robust. Using a building as the windbreak part 11, as shown in FIGS. 4 and 5, eliminates the cost of installing a new windbreak part 11 and is more robust than panels or netting.

Figure 3:
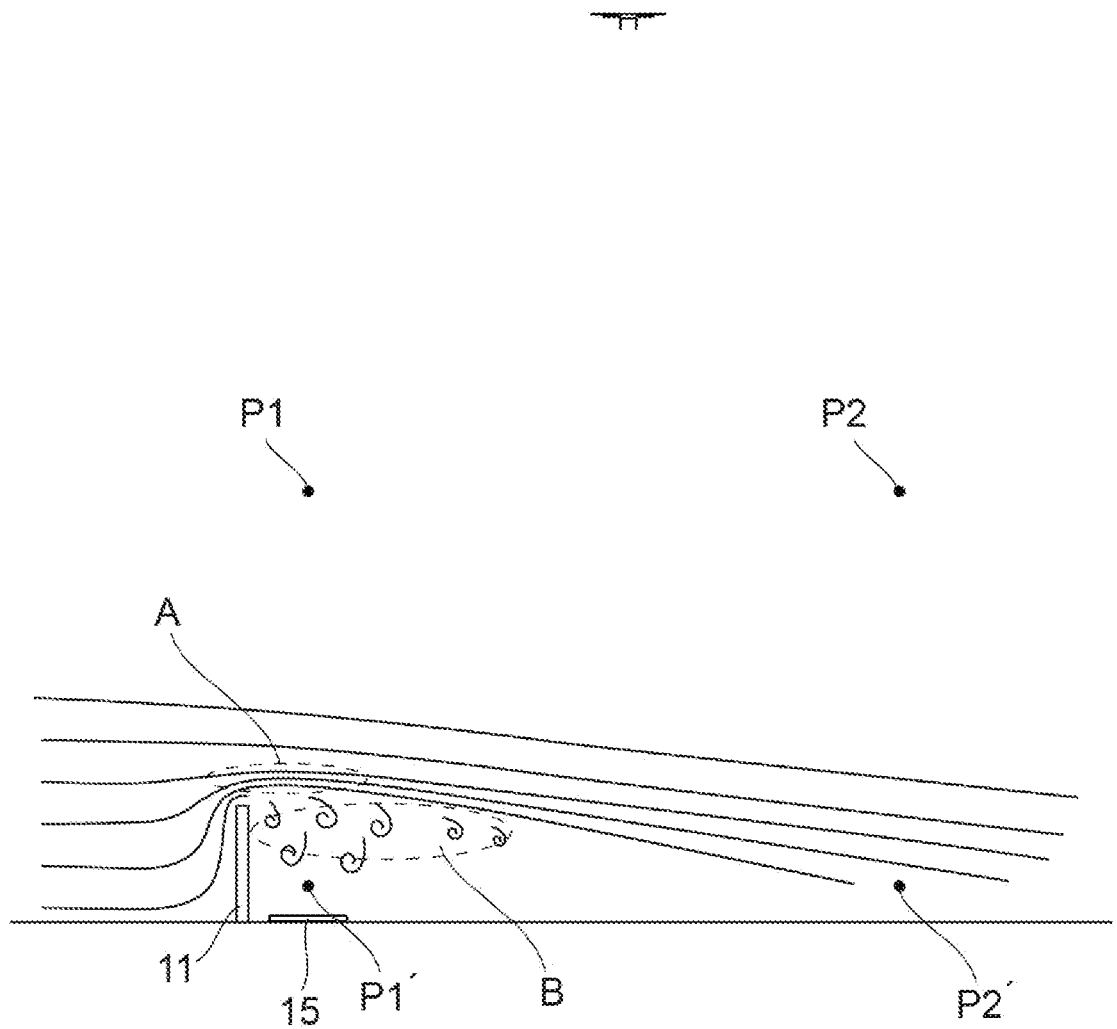

When the windbreak part 11 is made of a material that is difficult for air to pass through, such as a fine mesh material, panel, or building material, a strong windbreak effect can be expected. However, as shown in FIG. 3, wind hitting the windbreak part 11 rises to avoid the windbreak part 11, compressing the air in the area A above the windbreak part 11. Then, in the vicinity of area B beyond the windbreak part 11, air vortexes are easily generated due to the difference in atmospheric pressure. The vortex generated disturbs the airflow in the first area, which may cause instability in the takeoff and landing of flight vehicles.

When a flight vehicle landing in the first area 12 descends from both points P1 and P2 in FIG. 3, at P1, the aircraft is close to the air compression area A and the vortex generation area B. Therefore, the flight vehicle, which was descending in an attitude against the constant wind, will enter the rapid and turbulent flow, which may result in flight instability. P2 is farther away from the point of air eddy generation than P1. Therefore, the changes in the airflow during the descent of the aircraft are milder and within the range of the windbreak effect, resulting in more flight stability than when descending from point A1.

However, when comparing P1', which is vertically below P1, and P2', which is vertically below P2, it is possible to obtain a windbreak effect at P2' as well, but it is clear that P1', which is closer to the windbreak part 11, is more windbreak effective and therefore more suitable for landing flight vehicles. Therefore, flight vehicles can be safely landed by dividing the descent into at least two or more stages, so that the descent of the flight vehicle can be made at P2, which is farther from the windbreak part, and the landing of the flight vehicle can be made at P1', which is closer to the windbreak part 11.

The material used for the windbreak part 11 may have a different degree of windbreak effect in different parts. For example, if a net is used, the mesh can be rough in the upper part and finer in the lower part, making the wind proofing effect weaker in the upper part and gradually stronger toward the lower part, preventing air compression near the area A and vortex generation near the area B, enabling a more stable takeoff and landing.

In addition, once the flight vehicle has entered the windbreak effect range, it can proceed and land in an area where the air flow is calmer than outside the range, which can improve stability and reliability in the series of operations from descent to landing of the flight vehicle.

The second area 13, located away from the first area 12 with respect to the windbreak part 11, is the area where the flight vehicle performs the descent. The trigger for the flight vehicle to start its descent should be provided by GNSS or other location information, or by a marker, beacon, or other descent instruction unit provided in the second area 13.

The trigger should be determined appropriately according to the environment and operational method, for example, by setting up a panel in the second area 13 with a marker that is a descent instruction facing upward and captured by the flight vehicle's imaging equipment, or by recognizing that a point that is a predetermined distance from the first area 12 (which becomes the second area 13) has been reached using GNSS information. The trigger may be equipped with multiple methods for redundancy.

The flight vehicle 100 entering the second area lowers the altitude of the flight vehicle below a predetermined altitude. At this time, the second area 13 should be located not more than a predetermined distance from the windbreak part 11, and the altitude of the flight vehicle after descending should be set lower than the top of the windbreak part 11, so that the flight vehicle can obtain the full windbreak effect of the windbreak part 11.

The determination of the distance between the windbreak part 11 and the second area 13 should be appropriately determined according to the nature of the material or structure used as the windbreak part 11 and the operating environment. For example, since the windbreak effect range (horizontal direction) with nets is generally considered to be 20 times the height of the windbreak part, when the windbreak part 11 shown in FIG. 2 uses nets, if the vertical height b from the top of the windbreak part 11 to the landing surface in the first area 12 is n meters, the horizontal distance from the edge of the windbreak part 11 to the edge of the second area 13, the horizontal distance a from the edge of the windbreak 11 to the edge of the second area 13 should be provided within n×20 meters.

The first area 12 in the landing facility 10 may be provided at an elevated location offset from the ground by a certain distance. For example, it may be offset a certain distance from the ground to prevent third parties or living creatures on the ground from touching the flight vehicle and causing accidents (for example, in Japan, an offset of about 2 meters or more is considered suitable to reduce the risk of third parties touching the flight vehicle), or it may be installed on the upper floors, roofs, rooftops, etc. of a building 30 for the convenience of flight and landing locations.

Figure 6:
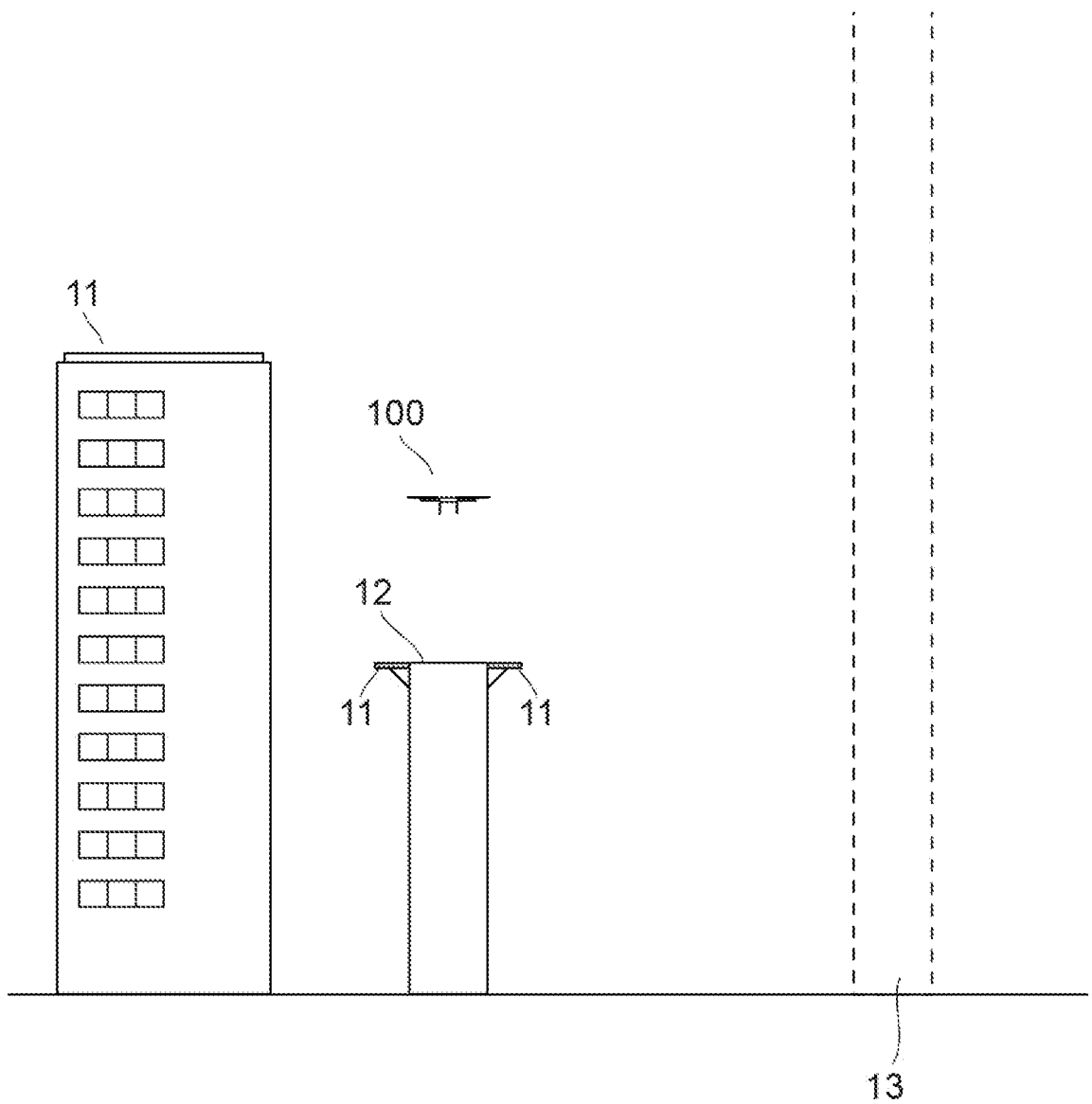
FIG. 6 shows a side view of a landing facility according to the invention, with the landing facility located on the upper edge of a building.

When the first area 12 is elevated, it is desirable to reduce not only crosswinds but also updrafts. By providing an additional windbreak part near the upper edge of the first area that extends outward from the first area, rather than vertically above it, the updrafts that are caused by flight vehicles entering the first area 12 can be reduced. For example, as shown in FIG. 6, the windbreak part 11 extending outward from the first area should extend in a substantially horizontal direction and be provided near the top edge of the building, but it may also extend diagonally upward from the building or be provided on the side of the building, depending on the building and environment in which the first area is provided.

The windbreak part 11 may be folded, shrunk, stored, etc., while not in use, thereby minimizing the amount of time that sound is generated by wind hitting the windbreak part 11 and not detracting from the aesthetics of the building or other structure.

By installing the windbreak part 11 on a vehicle or other moving vehicle, it is possible to efficiently install the windbreak part 11 on a short-term experimental landing facility or a temporary landing facility 10 for a festival.

Details of the Second Embodiment

In the details of the second embodiment of this invention, the components that overlap with those of the first embodiment operate in the same manner, so they will not be described again.

Figure 7:
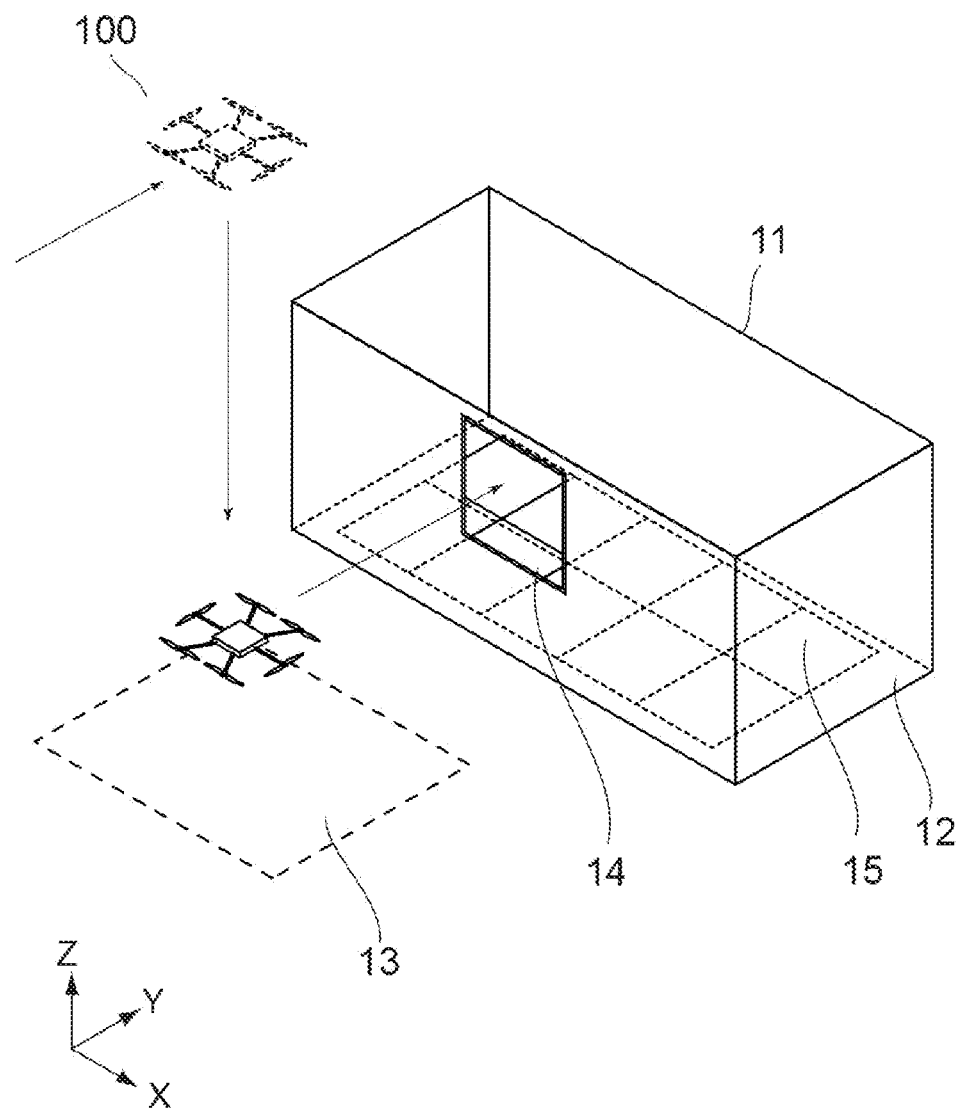
FIG. 7 shows a perspective view of one of the configurations of the landing method according to the invention.
Figure 8:
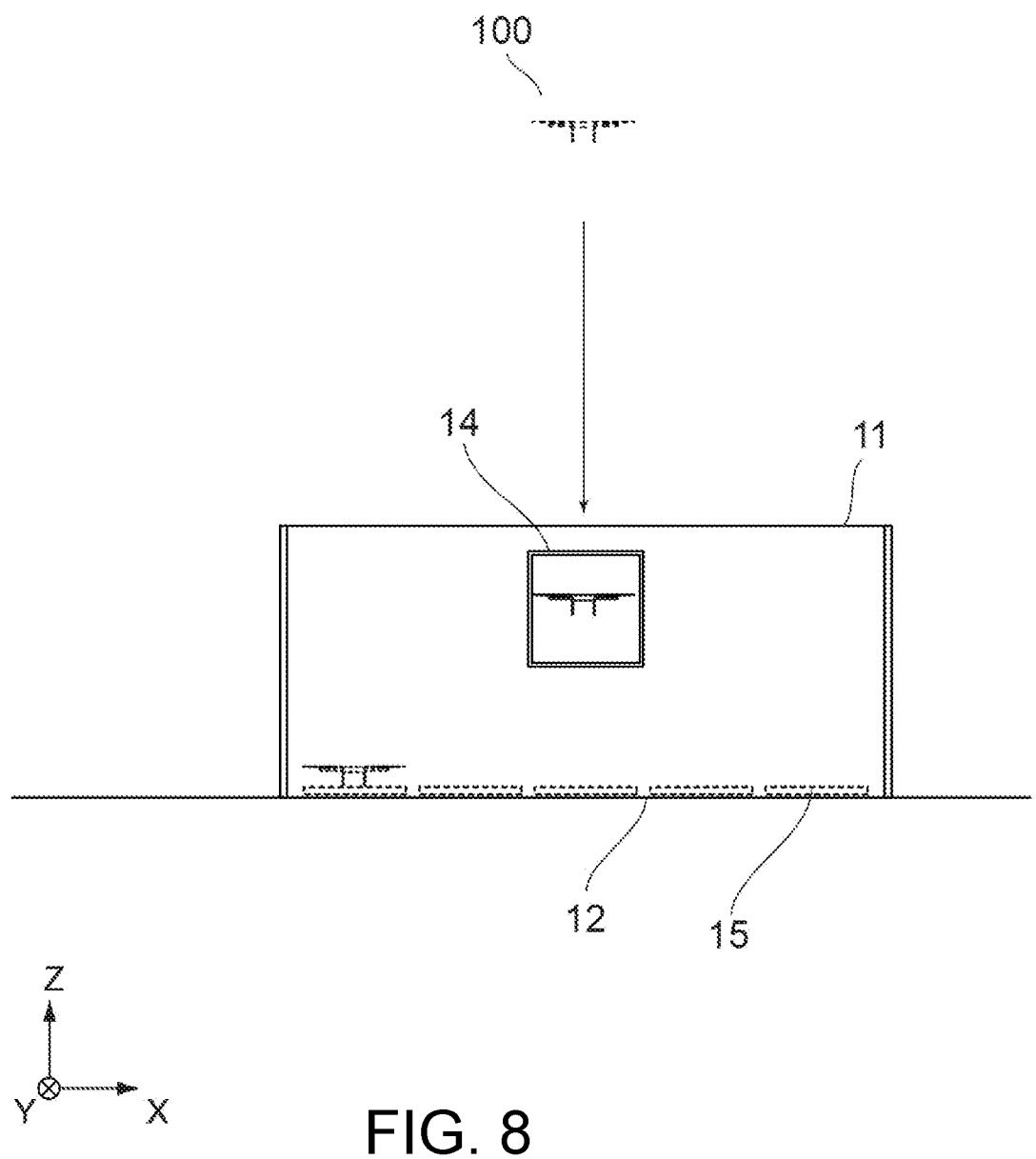
FIG. 8 shows a front view of the landing method of FIG. 6.
Figure 9:
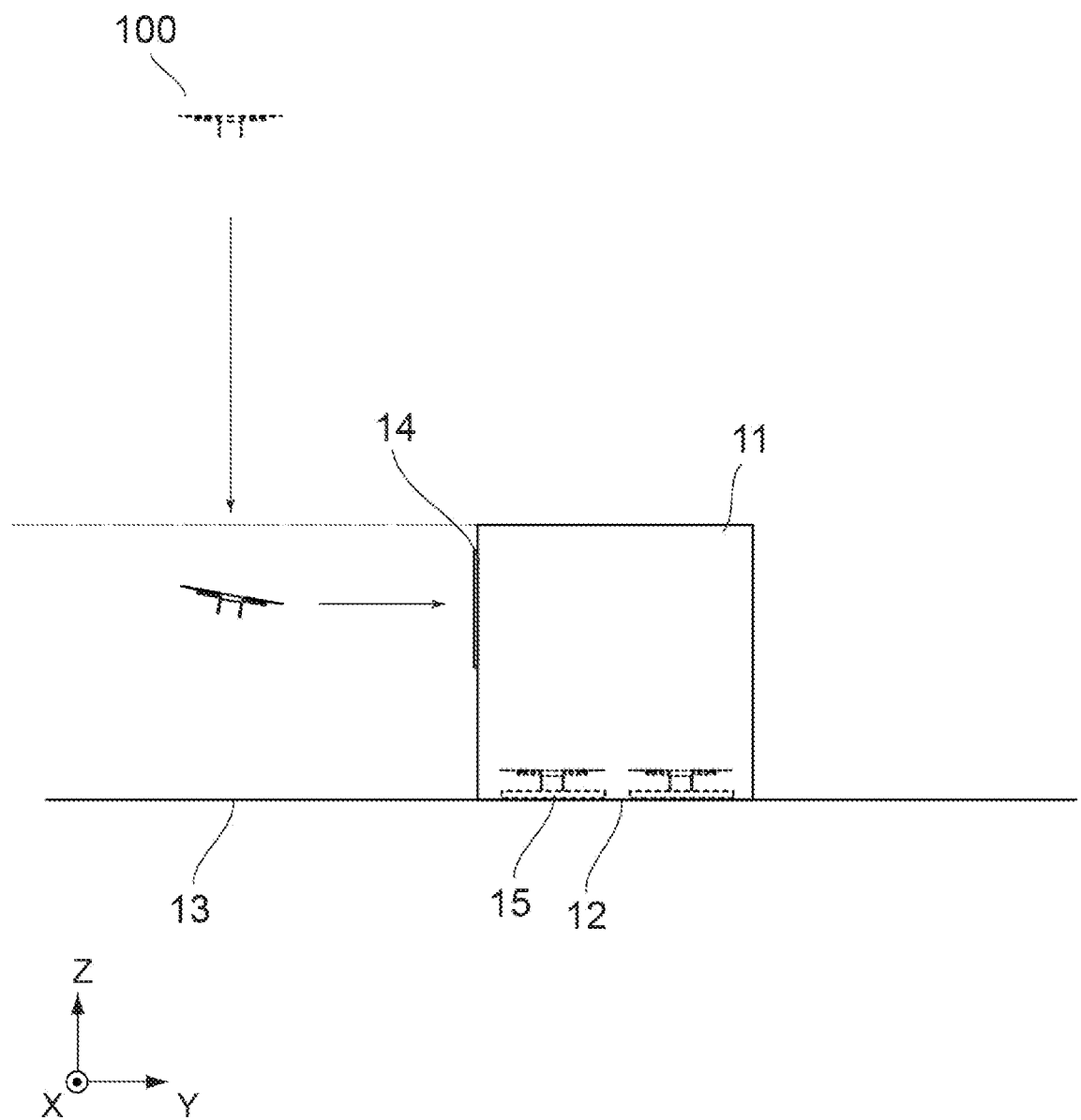
FIG. 9 shows a side view of the landing method of FIG. 6.
Figure 11:
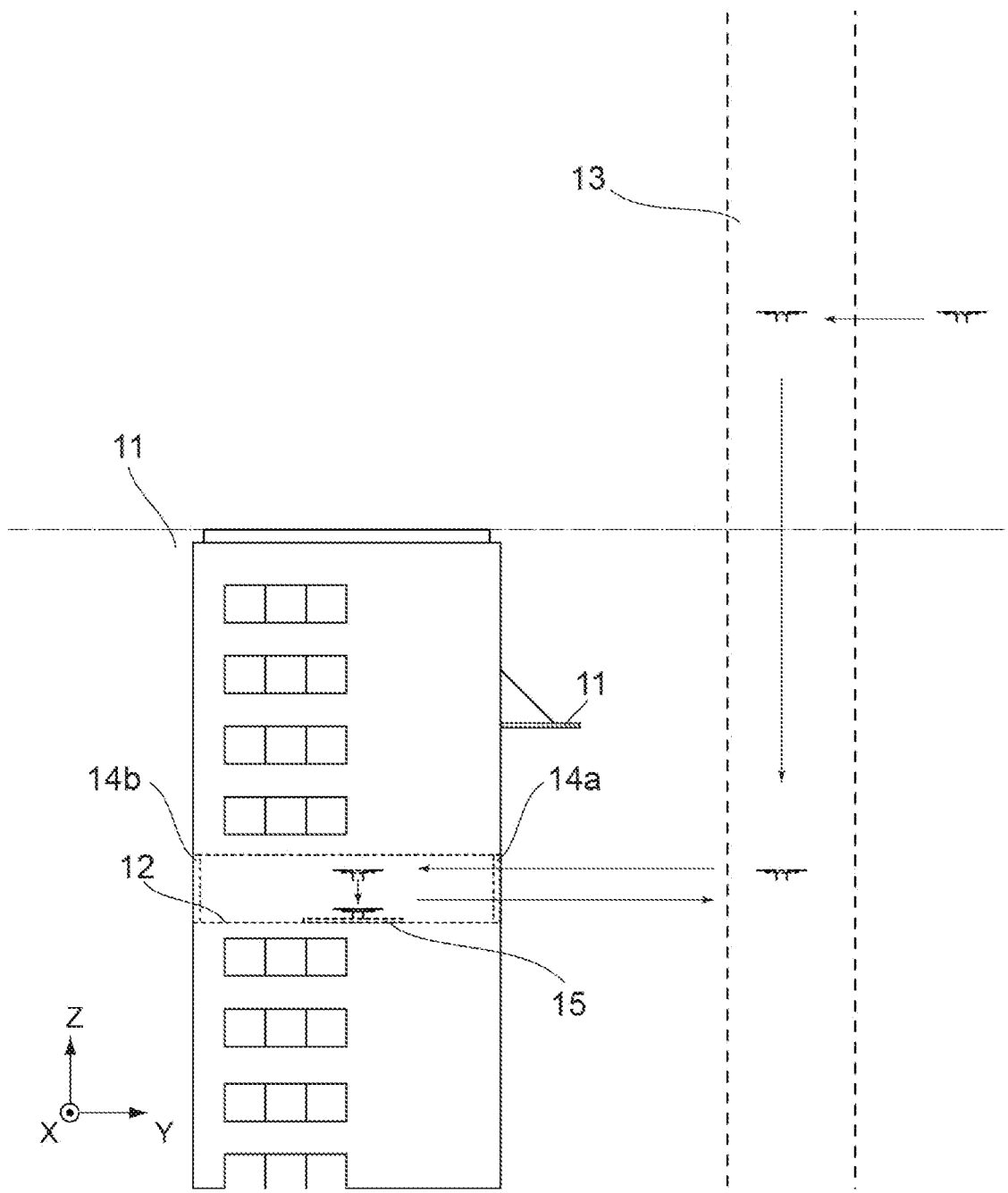
FIG. 11 shows a side view of one of the landing facility configurations according to the invention.
Figure 12:
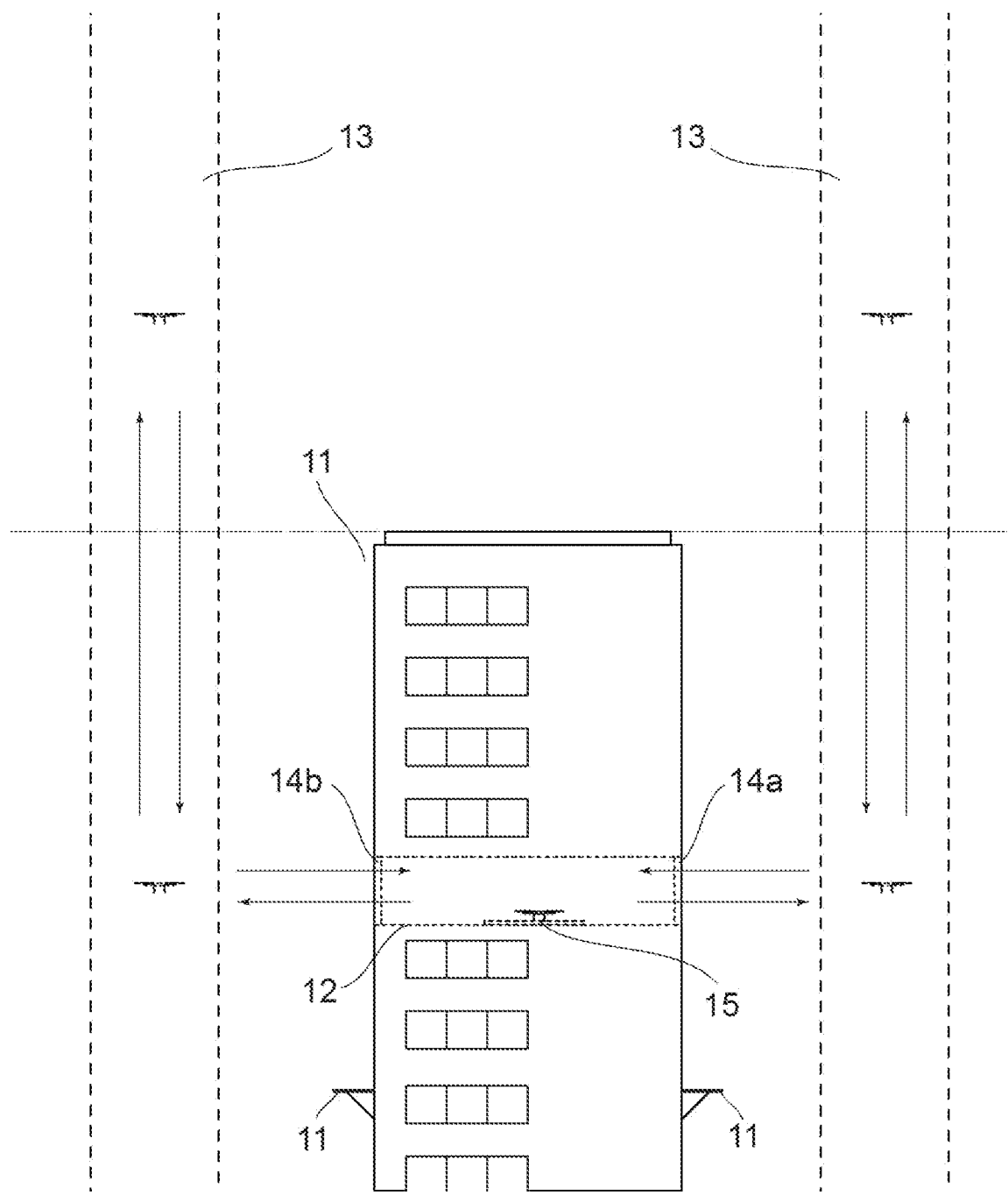
FIG. 12 shows a side view of an example of the landing facility according to the invention.

In the case where the first area 12 is covered with a windbreak part 11 and an approach part 14 is provided where the flight vehicle 100 can pass through the windbreak part 11 and land on the landing part 15, as shown in FIGS. 7-9, or in the case where the first area 12 is provided inside a building, as shown in FIGS. 11 and 12, the flight vehicle that performs a descent operation in the second area 13 passes through the approach part in a substantially horizontal flight and proceeds over the first area. Since the landing operation is performed in the wind weakened by the windbreak part 11, the flight vehicle can land stably.

Since the flight vehicle 100 passes through the approach part 14 in a substantially horizontal flight, the flight vehicle can enter the space surrounded by the windbreak part 11 earlier than in a vertical descent. Furthermore, the flight vehicle is less likely to exit the space after entering the space surrounded by the windbreak part 11, which improves the safety of the surroundings in areas where third parties are nearby.

Figure 10:
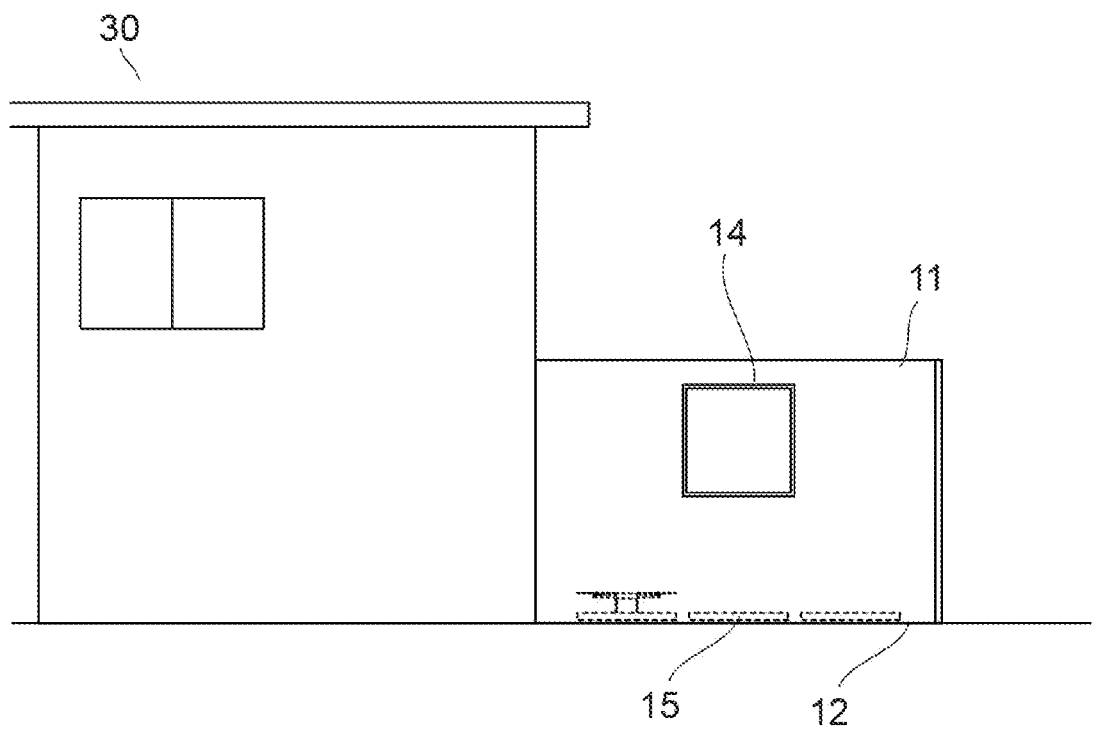
FIG. 10 shows a front view of one of the landing facility configurations according to the invention.

When the first area 12 is attached to a building, it is possible to use an exterior wall of the building as a part of the windbreak part 11. For example, as shown in FIG. 10, one side of the windbreak part can be used as an exterior wall of the building, and a door that people can pass through can be provided between the building and the space enclosed by the windbreak part to facilitate recovery of the landed aircraft.

When the first area is located inside a high-rise building, air impinging on the windbreak part 11 may become an updraft or a downdraft, which may interfere with the addition of flight vehicles. Therefore, it is desirable to provide two or more approach parts (e.g., south and north, east and west, and various combinations of east, west, south, and north) in consideration of the topography and wind tendencies, as shown in FIG. 11, so that a safer entry direction can be selected according to wind direction and other factors. When a building is provided with multiple approach parts 14, the flight vehicle can most efficiently receive the windbreak effect of the windbreak part 11 by using the approach part 14 provided on the leeward side of the windbreak part 11. For example, if approach parts 14 are provided on four sides of a building, east, west, north, south, and the north face of the building is directly facing the wind in an environment where the wind blows from the north, the approach part 14 on the south side of the building should be selected. In this case, the approach parts 14 on the east or west faces of the building are less suitable for flight vehicles to enter the building than those on the south face, because the wind hitting the north face of the building flows along the sides of the building, resulting in strong crosswinds in the surrounding area.

When a flight vehicle approaches the approach part 14, the flight vehicle is more likely to lose its posture if it is subjected to strong wind from the side direction relative to the direction of travel. Selecting an approach part 14 that can receive wind from the front or the rear improves the stability and accuracy of flight during approach. Since the wind direction, wind speed, and the shape and orientation of the building relative to the wind are not always constant, and conditions vary depending on the location of the first area 12, it is desirable to consider a suitable location for the approach part 14 based on past weather data and other factors. An openable mechanism may be provided for the approach part 16 to prevent the inflow of wind and other elements from the approach part 14 that is not used for entry.

The second area 13 in which the flight vehicle 100 descends may be predetermined around the first area 12, limited to within a predetermined permitted area where vertical movement of the flight vehicle is permitted.

For example, when a building with the function of the windbreak part 11 encompasses the first area 12, the second area 13 where the flight vehicle 100 descends is set in a predetermined permitted area near the building, where vertical movement of the flight vehicle 100 is permitted. When the building encompassing the first area is a tower condominium, there are areas (such as walkways, plazas, parking lots, etc.) on the condominium site that can be easily entered by third parties. Over such areas, it is desirable to make them restricted areas that limit the vertical movement of flight vehicles so that they are not set in the second area 13.

When the flight vehicle 100 performs a vertical descent, the flight vehicle may become unstable due to crosswinds or updrafts, so areas where airflow turbulence is expected (e.g., near high-rise structures or where building winds blow in) should also be areas where vertical movement of the flight vehicle is restricted.

As shown in FIG. 12, if there are multiple second areas 13 around the building encompassing the first area 12, the flight vehicle 100 may further select and use a second area suitable for descent when descending. By selecting and using a second area suitable for descent based on the wind direction and the conditions of flight vehicles other than the own flight vehicle, improved stability during descent can be expected. For example, when the wind is blowing, selecting the second area on the leeward side of the building containing the first area will provide efficient wind protection.

The second area 13 to be used by the flight vehicle 100 may be determined prior to the flight based on past weather observation data, pre-flight conditions, etc., or based on weather and second area utilization data obtained by the flight vehicle 100, other flight vehicles, or ground stations during the flight. These determinations may be used to set the type of permitted area in which flight vehicles are allowed to move vertically or the type of restricted area in which they are restricted, and to select the area to be used as the second area 13 out of said permitted area.

In a given area where flight vehicles are allowed to move vertically, there is a possibility that areas where flight vehicles tend to become unstable may appear or be discovered after the start of operations due to various factors such as turbulence in the sky or new structures, which are difficult to assume before the start of operations. By accumulating flight vehicle flight logs and obstacle records, areas where flight vehicles are descending stably will continue to be designated as permitted areas where vertical movement of flight vehicles is permitted. On the other hand, areas where flight vehicles are not descending stably (e.g., where there are records of flight attitude disorders or crashes) are changed to restricted areas where vertical movement of flight vehicles is restricted. By doing so, the reliability of the flight vehicle's descent in the second area 13 can be further improved.

In addition, depending on the various factors mentioned above, the multiple permitted areas and multiple restricted areas may be weighted based on the stability and safety of the aircraft or third party, and the area with the highest stability and the safest area, for example, may be selected as the second area 13 according to said weighting.

As shown in FIG. 12, when multiple approach parts 14 are provided, flight vehicles entering from the respective approach parts may exit from the same approach part from which they entered, or they may exit from a different approach part than the one from which they entered. Especially when there is no wind, all flight vehicles may enter from the approach part 14a and exit from the approach part 14b, thereby preventing congestion in the approach part and the first area. The approach part in this case may be a mere opening, or it may be an opening in the windbreak part 11 as described in FIG. 7, etc., or it may comprise a windbreak part with such an opening on one side only (especially the side where the wind flows in strongly).

When the building encompasses the first area, in areas with low wind flow or areas with weak winds, the approach parts 14 may be connected to each other inside the building, as shown in FIG. 12, so that the flight vehicle 100 can easily come and go, for improved convenience. In locations where the wind is strong and the wind passing through the building becomes stronger if the approach parts facing each other are connected, the wind may be prevented from passing through the building smoothly and strong winds such as valley winds may be prevented by making the approach parts separate spaces with walls or by providing obstructions, thereby improving the stability of the flight vehicle flying through the building.

Furthermore, the windbreak part 11 may be provided extending from the wall or top of the building to reduce the impact of updrafts and descending airflows on flight. A higher location in the second area 13 relative to the predetermined altitude at which the flight vehicle 100 will fly after descent will reduce the descending airflow, and a lower location will reduce the ascending airflow.

The flight vehicle 100 must be able to enter through the approach part 14, and the approach part 14 has an area greater than or equal to the front projected area of the flight vehicle at the time of entry. However, it does not have to be a rectangular opening that is always open; it can be a slit-shaped gap, an oval-shaped hole, or can have an open/close function.

Figure 13:
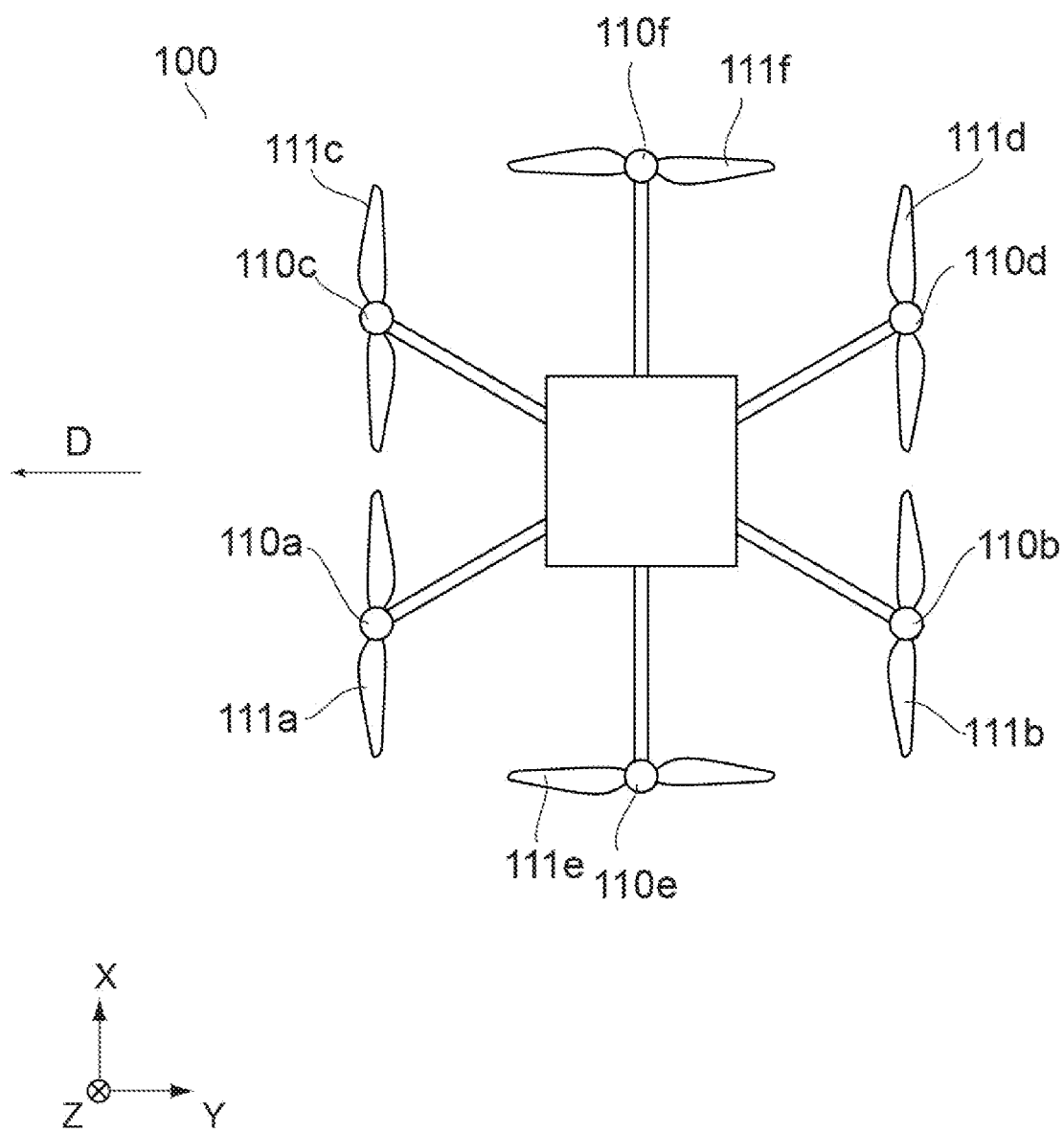
FIG. 13 shows a top view of a flight vehicle according to the invention.

The flight vehicle 100 shown in FIG. 13 is described below. However, these are not restrictions on the form of the flight vehicle. Flight vehicles operated with a landing facility in the invention need only be capable of landing on a landing facility. The landing facility of the invention is expected to be particularly effective in landing flight vehicles such as VTOL aircraft and multicopter aircraft with multiple motors, which can land substantially vertically and should not be subjected to strong winds when landing.

As shown in FIG. 13, the flight vehicle 100 should have at least propeller 110, motor 111, and other elements for flight, and energy (e.g., secondary batteries, fuel cells, fossil fuel, etc.) to operate them.

The flight vehicle 100 shown in the figure is depicted in a simplified form to facilitate the explanation of the invention's structure, and detailed components such as the control part, for example, are not shown in the figures.

The flight vehicle 100 and the mobile vehicle 200 are moving forward in the direction of arrow D (−YX direction) in the figure (see below for details).

In the following explanation, the terms may be used according to the following definitions. Forward/backward: +Y and −Y; up/down (or vertical): +Z and Z; left/right (or horizontal): +X and −X; forward (advancing direction): −Y; backward (backward direction): +Y; up (upward): +Z; down (downward): −Z The propeller 110 rotates under the output from the motor 111. The rotation of the propeller 110 generates propulsive force to take the flight vehicle 100 off from its starting point, move it, and land it at its destination. The propeller 110 can rotate to the right, stop, and rotate to the left.

The propeller 110 provided by the flight vehicle of the invention has one or more blades. Any number of blades (rotors) (e.g., 1, 2, 3, 4, or more blades) is acceptable. The shape of the blades can be any shape, such as flat, curved, kinked, tapered, or a combination thereof. The shape of the blades can be changeable (e.g., stretched, folded, bent, etc.). The blades can be symmetrical (having identical upper and lower surfaces) or asymmetrical (having differently shaped upper and lower surfaces). The blades can be formed into airfoils, wings, or any geometry suitable for generating dynamic aerodynamic forces (e.g., lift, thrust) when the blades are moved through the air. The geometry of the vane can be selected as appropriate to optimize the dynamic aerodynamic characteristics of the vane, such as increasing lift and thrust and reducing drag.

The propeller provided by the flight vehicle of the invention may be, but is not limited to, fixed pitch, variable pitch, or a mixture of fixed and variable pitch.

The motor 111 produces rotation of the propeller 110; for example, the drive unit can include an electric motor or engine. The blades can be driven by the motor and rotate around the axis of rotation of the motor (e.g., the long axis of the motor).

The blades can all rotate in the same direction or can rotate independently. Some of the blades rotate in one direction while others rotate in the other direction. The blades can all rotate at the same RPM, or they can each rotate at a different RPM. The number of rotations can be determined automatically or manually based on the dimensions of the moving object (e.g., size, weight) and control conditions (speed, direction of movement, etc.).

The flight vehicle 100 determines the number of revolutions of each motor and the angle of flight according to the wind speed and direction by means of a flight controller or radio. This allows the flight vehicle to move up and down, accelerate and decelerate, and change direction.

The flight vehicle 100 can fly autonomously according to routes and rules set in advance or during the flight, or it can be piloted using a propo.

Figure 14:
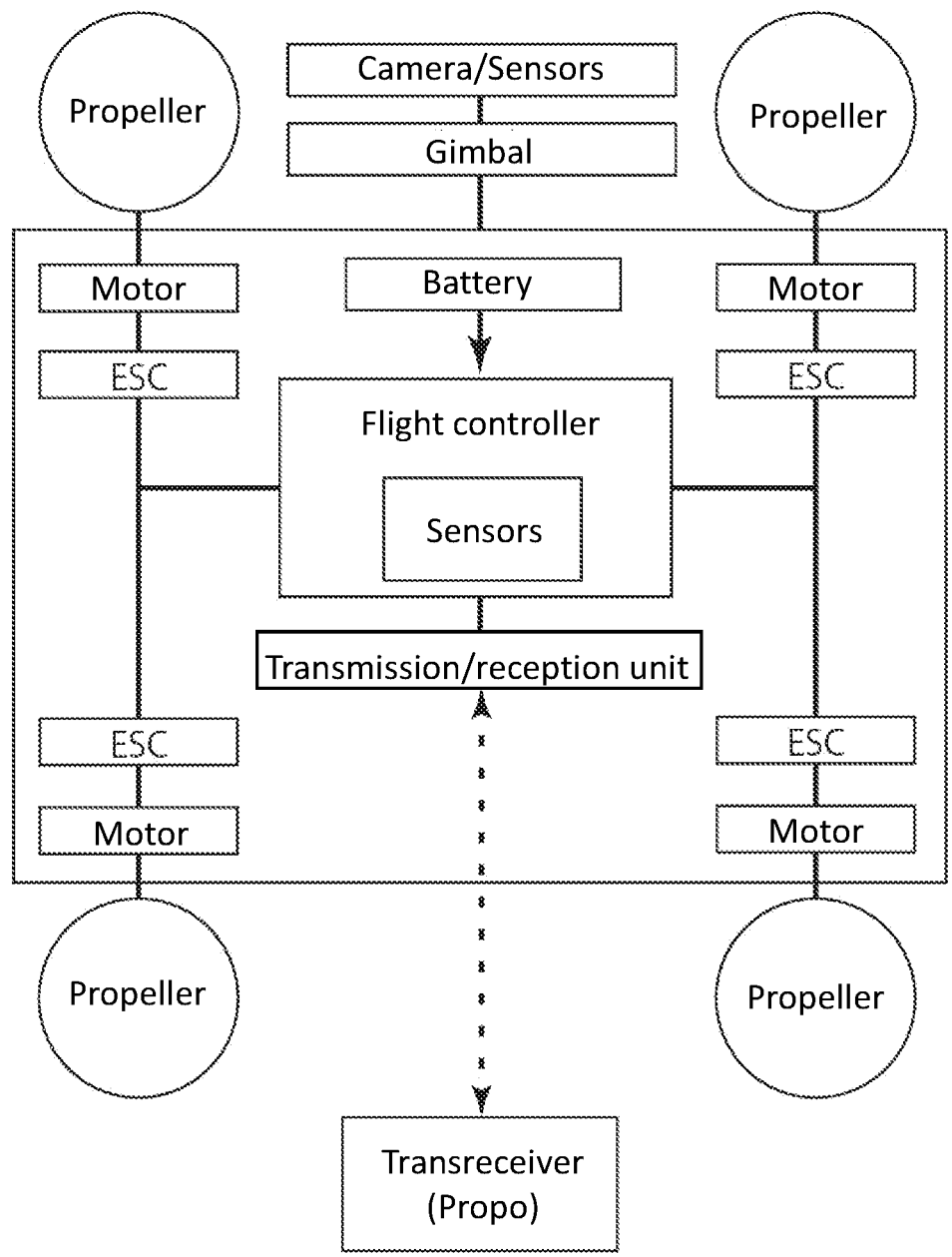
FIG. 14 shows a functional block diagram of the flight vehicle of FIG. 13.

The flight vehicle described above has the functional blocks shown in FIG. 14. The functional blocks in FIG. 14 are a minimum reference configuration. The flight controller is a so-called processing unit. The processing unit can have one or more processors, such as a programmable processor (e.g., central processing unit (CPU)). The processing unit has a memory, not shown, which is accessible. The memory stores logic, code, and/or program instructions that can be executed by the processing unit to perform one or more steps. The memory may include, for example, a separable medium such as an SD card, random access memory (RAM), or an external storage device. Data acquired from cameras and sensors may be directly transmitted to and stored in the memory. For example, still and moving image data captured by a camera or other device is recorded in the internal or external memory.

The processing unit includes a control module comprising to control the state of the rotorcraft. For example, the control module controls the propulsion mechanism (e.g., motor) of the rotorcraft to adjust the spatial arrangement, velocity, and/or acceleration of the rotorcraft having six degrees of freedom (translational motion x, y and z, and rotational motion θx, θy and θz). The control module can control one or more of the states of the onboard parts and sensors or the like.

The processing unit is capable of communicating with a transmission/reception unit comprised of one or more external devices (e.g., terminal, display, or other remote controller) to transmit and/or receive data. The transmitter/receiver can use any suitable means of communication, such as wired or wireless communication. For example, the transmission/reception unit can use one or more of the following: local area network (LAN), wide area network (WAN), infrared, wireless, WiFi, point-to-point (P2P) network, telecommunication network, or cloud communication. The transmission/reception unit can transmit and/or receive one or more of the following: data acquired by sensors, processing results generated by the processing unit, predetermined control data, and user commands from a terminal or remote controller.

Sensors in this embodiment can include inertial sensors (accelerometers, gyroscopes), GPS sensors, proximity sensors (e.g., lidar), or vision/image sensors (e.g., cameras).

The above mentioned embodiments are merely examples to facilitate understanding of the invention and are not intended to be construed as limiting the invention. It goes without saying that the invention may be changed and improved without departing from its purpose, and that the invention includes its equivalents.

DESCRIPTION OF REFERENCE NUMERALS

10 Landing facility
11 Windbreak part
12 First area
13 Second area
14 Approach part
15 Landing area
100 Flight vehicle
110a-110e Propellers
111a-111e Motors

The invention claimed is:

1. A landing facility, comprising:
a first area for landing a flight vehicle;
a windbreak part that has a predetermined height and covers at least a portion of the surroundings of the first area; and
a second area located apart from the windbreak part and allowing the flight vehicle to descend in a vertical direction to a predetermined flight altitude,
wherein the windbreak part is a building, and
wherein the building includes a first approach part and a second approach part that are provided on a first face and a second face of the building, respectively, the first face and the second face being opposite to each other.

2. The landing facility according to claim 1,
wherein the flight altitude is lower than the predetermined height of the windbreak part.

3. The landing facility according to claim 2,
wherein the second area is an area selected from a plurality of permitted areas where vertical descent is permitted.

4. The landing facility according to claim 2,
wherein the second area includes a descent instruction unit that instructs the flight vehicle to descend to a predetermined flight altitude.

5. The landing facility according to claim 1,
wherein the second area is an area selected from a plurality of permitted areas where vertical descent is permitted.

6. The landing facility according to claim 5,
wherein the second area includes a descent instruction unit that instructs the flight vehicle to descend to a predetermined flight altitude.

7. The landing facility according to claim 1,
wherein the second area includes a descent instruction unit that instructs the flight vehicle to descend to a predetermined flight altitude.

8. The landing facility according to claim 1,
wherein the first area includes a landing instruction unit that instructs the flight vehicle to land.

9. The landing facility according to claim 1, wherein the first and second approach parts are connected to each other to make the flight vehicle enter through the first approach part and exit from the second approach part.

10. The landing facility according to claim 1, wherein the building further includes a third approach part and a fourth approach part that are provided on a third face and a fourth face of the building, respectively, the third face and the fourth face being opposite to each other,
wherein an openable mechanism is provided for each of the first, second, third, and fourth approach parts to make the second approach part open for allowing the flight vehicle to enter therethrough and make the third and fourth approach parts closed for preventing inflow of wind, when the wind hits the first face of the building.

11. A method of landing using a landing facility, wherein the landing facility includes: a first area for landing a flight vehicle; a windbreak part that has a predetermined height and covers at least a portion of the perimeter of the first area; and a second area located apart from the windbreak part and allowing the flight vehicle to descend to a predetermined flight altitude, the method comprising descending the aircraft in a vertical direction to the predetermined flight altitude in the second area and then landing in the first area,
wherein the windbreak part is a building, and
wherein the building includes a first approach part and a second approach part that are provided on a first face and a second face of the building, respectively, the first face and the second face being opposite to each other.

12. The landing method according to claim 11,
wherein the flight altitude is an altitude lower than the predetermined height of the windbreak part.

* * * * *